Patented Oct. 23, 1951

2,572,420

UNITED STATES PATENT OFFICE 2,572,420

PRODUCTION OF NITROPOLYSTYRENE

Henryk Zenftman, Salcoats, and Andrew McLean, West Kilbride, Scotland, assignors to Imperial Chemical Industries Limited, a corporation of Great Britain No Drawing. Application July 8, 1947, Serial No. 759,716. In Great Britain September 4, 1946

9 Claims. (Cl. 260—93.5)

The present invention relates to a process for the production of nitropolystyrene and is particularly concerned with the provision of an improved process for the production of a nitro substituted styrene polymer of any desired nitrogen content varying from 9.4% to 14.4% corresponding to a degree of substitution between 1.0 and 2.0.

Blyth and Hoffman (Liebig Annalen LIII 316, 1845) nitrated a styrene polymer (metastyrol) with fuming nitric acid at boiling temperature and obtained a product of 10.06% nitrogen, soluble in nitric and sulphuric acids, but insoluble in most of the known solvents. They called this product nitrometastyrol.

It has now been found that polystyrenes of different molecular weight can be nitrated with a mixed acid consisting of 90% to 60% nitric acid, 10% to 40% sulphuric acid and —3% to 8% water to give nitration products having from about 9.3% to 14.4% of nitrogen. The nitrogen content of the nitropolystyrenes depends on the water content of the nitrating acid, the temperature and the time of nitration. The molecular weight of the product depends on the molecular weight of the original polystyrene and the time and temperature of nitration.

Mixed nitric and sulphuric acids of the above mentioned compositions dissolve polystyrene and make it possible to carry out the nitration in a one phase system, thereby facilitating a uniform nitration. The presence of the sulphuric acid facilitates the introduction of the second nitrogroup into the styrene unit of the polymer chain and leads to products of a nitrogen content up to 14.4%. If the amount of sulphuric acid is however too high, so as to reduce the nitric acid content below 60% the product is no longer soluble in the mixed acid and the nitration cannot be carried out in a one phase system. During nitration a partial degradation of the polystyrene chain takes place. This is found to occur predominantly in the initial stages of nitration and increases with the temperature of nitration.

It was found that the introduction of the first nitrogroup takes place rapidly and the rate of reaction is controlled only by the time of dissolution of the granules or powder of polystyrene. The heat of reaction is liberated in a short space of time and effective stirring and cooling are necessary to control the temperature at this stage. The substitution of the second nitrogroup takes place at a slower rate allowing the liberated heat of reaction to dissipate and maintain a constant temperature throughout this phase of reaction without difficulty.

It was further found that to avoid a substantial degradation during the first stages of nitration the temperature should not exceed 20° C.

According to the present invention, therefore, the process for the production of nitropolystyrene of any degree of nitration from about 9.4% to 14.4% of nitrogen comprises adding one part of granulated or powdered polystyrene to at least 8 parts of a mixed nitrating acid consisting of 90% to 60% nitric acid, 10% to 40% sulphuric acid and 8% to —3 water, the said acid being stirred and cooled during the said addition and until the suspended granules or powder of polystyrene is dissolved to form a viscous liquid, if necessary permitting the nitration to continue in the said viscous liquid at a temperature of between 0° and 60° C. until the desired degree of nitration is obtained, and precipitating the nitropolystyrene from the viscous liquid preferably by introducing it into water or diluted refuse acid of at least 40% water content.

The addition of concentrated sulphuric acid to the viscous liquid can also be used to precipitate the nitropolystyrene.

A particularly suitable mixed nitrating acid is one consisting of 80% to 70% nitric acid, 20% to 30% sulphuric acid and 5% to —2% water.

Preferably the mixed acid is brought to a temperature of 0° to —15° C. and the bulk of the granulated or powdered polystyrene is added quickly under intensive stirring thereby eliminating localised overheating during the addition.

It is usually desirable to employ a higher ratio of mixed acid with respect to the polystyrene the higher the molecular weight of the polystyrene. This is done in order to avoid the handling of a too viscous solution during the nitration.

The purification of the nitropolystyrene from traces of acid is preferably carried out by washing with cold water, steaming for one hour at 90° to 100° C., and subsequently grinding under water.

Nitropolystyrenes of 9.4%–14.4% nitrogen are amorphous solid substances of yellowish white colour which become yellow when exposed to daylight. When heated to a temperature approaching 300° C. they decompose rapidly with a flash and evolution of black fumes. The decomposition is the more rapid the higher is the nitrogen content of the nitropolystyrene. They are soluble in nitric acid, nitroglycerine and dinitroglycol. Nitropolystyrenes of a nitrogen content above 11.8% are also soluble in cyclohexanone, cyclopentanone, furfural and similar ketones and aldehydes. They can also be plasticised by the majority of liquid aromatic and aliphatic nitro-compounds like dinitrotoluene mixture oil, nitrobenzene, nitromethane etc. The absorptive properties of the nitropolystyrenes towards the above mentioned plasticisers increase with the increase of the nitrogen content of the nitropolystyrenes Properly washed nitropolystyrenes are very stable on storage. Nitropolystyrenes are resistant to acid.

The nitropolystyrenes can replace nitrocellulose as a binder for explosive compositions when the latter could not be used because of its:

1. Instability in acid media or
2. Tendency to gelate under conditions which do not lead to the gelation of nitropolystyrene or
3. Low explosion point.

In this connection it is preferred to employ nitropolystyrenes containing more than 13% nitrogen because of their reduced desensitising effect on the explosive compositions. These nitropolystyrenes are also more readily dissolved in the solvents hereinbefore mentioned for nitropolystyrene and these nitropolystyrenes are also more readily plasticised.

The invention is illustrated by the following examples in which the parts are parts by weight:

Example 1

To a vessel provided with a stirring and cooling device and containing 15 parts mixed acid of composition nitric acid 73%, sulphuric acid 28%, water −1.0%, 1 part of granulated polystyrene molecular weight 200,000 passing a 16 to 30 B. S. sieve, is added under efficient stirring. The time of addition of the polystyrene is about 3 minutes and the cooling has to be efficient enough to maintain the temperature of the mixture below 20° C. The stirring is continued at this temperature until the suspended granules of polystyrene are dissolved and a clear uniform viscous liquid is formed. This takes about 30 minutes.

The nitration is then continued for 3 hours in the same or another vessel, with reduced stirring, at a temperature of 40° C.

The viscous solution of the nitropolystyrene thus formed is introduced in the form of one or more thin streams into a vessel containing an excess of water or spent acid diluted to at least 40% water content and provided with a stirrer. The nitropolystyrene is precipitated in the form of threads which subsequently break up into thin rod-shaped granules.

The granules are washed until the wash water is neutral to methyl orange. They are filtered and ground with 5 to 10 times their weight of water. This water becomes acid and is filtered off. The nitropolystyrene is continuously washed with water until the water remains neutral. After this the nitropolystyrene is steeped in water for 4 hours, heated under stirring with 20 times its weight of water at approximately 95° C. for one to two hours and dried at a temperature of 70° to 100° C.

The nitrogen content of the nitropolystyrene thus produced is 14.3% and the molecular weight is 100,000.

Example II

The procedure is the same as in Example 1 except that the mixed acid consists of nitric acid 70%, sulphuric acid 30% and water −1.0% and that the temperature of nitration after solution of the polystyrene is 50° C. The nitrogen content of the nitropolystyrene thus formed is 14.4% and the molecular weight of this product is 70,000.

Example III

The procedure is the same as in Example 1 except that the composition of the mixed acid consists of nitric acid 70%, sulphuric acid 27.5%, water 2.5%. The other variations from Example 1 are that the time of nitration, after solution of the polystyrene is 2½ hours and the temperature 20° C. The nitrogen content of the nitropolystyrene formed is 13.3% and the molecular weight 170,000.

Example IV

The procedure is the same as in Example III except that the composition of mixed acid is nitric acid 72.0%, sulphuric acid 26.5%, water 1.5%, and that the molecular weight of polystyrene used is 120,000. The nitrogen content of the nitropolystyrene thus formed is 13.3% and the molecular weight of this product is 120,000.

Example V

The procedure is the same as in Example 1 except that the composition of the mixed acid is nitric acid 79%, sulphuric acid 18%, water 5%; the time of nitration is one hour; and the temperature of nitration is 25° C. The nitrogen content of the nitropolystyrene found is 11.8%.

The nitropolystyrenes produced according to the process of the present invention have been found to have a number of useful applications, as for example, as a binding agent for explosives as before mentioned, as a bonding agent for incendiary and combustible compositions, and as hard water-repellent protective coatings.

We claim:

1. A process for the production of nitropolystyrene having a degree of nitration from about 9.4% to 14.4% of nitrogen which comprises adding one part of powdered polystyrene to at least eight parts of a nitrating acid mixture consisting of from 90% to 60% nitric acid, 10% to 40% sulfuric acid and 8% to −3% water, the said acid being agitated and cooled during the addition until the powdered nitropolystyrene is dissolved to form a viscous liquid, and precipitating the nitropolystyrene from the viscous liquid.

2. A process as set forth in claim 1 wherein the precipitation of the nitropolystyrene from the viscous liquid is effected by introducing it into water.

3. A process as set forth in claim 1 wherein the precipitation of the nitropolystyrene from the viscous liquid is effected by introducing it into diluted refuse acid of at least 40% water content.

4. A process as set forth in claim 1 wherein the precipitation of the nitropolystyrene from the viscous liquid is effected by the addition of concentrated sulfuric acid.

5. A process as set forth in claim 1 wherein the nitration is permitted to continue in the said viscous liquid at a temperature of between 0° and 60° C. until the desired degree of nitration is obtained.

6. A process as set forth in claim 1 wherein the acid mixture is brought to a temperature of between 0° and −15° C. and the bulk of the powdered polystyrene is added quickly under intensive agitation conditions.

7. A process as set forth in claim 1 wherein a higher ratio of mixed acid to polystyrene is used with higher molecular weights of the polystyrene.

8. A process as set forth in claim 1 wherein the nitropolystyrene produced is purified by washing with cold water and steaming at a temperature of 90 to 100° C. and subsequently grinding under water.

9. Nitropolystyrene having a degree of nitration of 13 to 14.4% nitrogen.

HENRYK ZENFTMAN.
ANDREW McLEAN.

REFERENCES CITED

The following references are of record in the file of this patent:

UNITED STATES PATENTS

| Number | Name | Date |
|---|---|---|
| 2,274,551 | Kenyon et al. | Feb. 24, 1942 |
| 2,366,008 | D'Alelio | Dec. 26, 1944 |
| 2,396,786 | Hanford | Mar. 19, 1946 |

OTHER REFERENCES

Bachman et al.: J. Org. Chem.; vol. 12, 1947 pp. 108, 119.

Barron: Modern Plastics; Wiley, 1945 page 409.